United States Patent [11] 3,629,902

[72] Inventor Gordon C. Leonard
 Dalton, Ga.
[21] Appl. No. 43,490
[22] Filed June 4, 1970
[45] Patented Dec. 28, 1971
[73] Assignee Meat Separator Corp.
 Dalton, Ga.

[54] BONE AND MEAT SEPARATOR
 9 Claims, 10 Drawing Figs.
[52] U.S. Cl. .................................................. 17/1 G,
 17/11
[51] Int. Cl. ...................................................... A22c 17/04
[50] Field of Search ........................................... 17/1, 46, 73

[56] References Cited
 UNITED STATES PATENTS
2,719,555 10/1955 Wood ............................ 17/73 X
2,761,479 9/1956 Geisler et al. .................. 17/1 G
3,118,172 1/1964 Childers ........................ 17/1 G Primary Examiner—Lucie H. Laudenslager
Attorneys—A. Yates Dowell and A. Yates Dowell, Jr.

ABSTRACT: Apparatus for separating meat from low-density bones and gristle to provide an edible food product. The apparatus includes a plurality of pairs of counterrotating rollers having helical grooves in which said rollers are spaced slightly apart to permit relatively soft meat to be pulled between the rollers while the harder bone and gristle will not pass therethrough. The helical grooves cause the material on the upper portion of the rollers to be moved lengthwise of the rollers and simultaneously rotated or tumbled so that substantially all of the meat will be removed from the bones.

INVENTOR
GORDON C. LEONARD

INVENTOR
GORDON C. LEONARD

BY
ATTORNEYS

INVENTOR
GORDON C. LEONARD

BY
ATTORNEYS

BONE AND MEAT SEPARATOR

BACKGROUND OF THE INVENTION

1. Field of the Invention

This invention relates generally to the separating of materials having different degrees of hardness and relates particularly to the separating of meat from bone and gristle.

2. Description of the Prior Art

Heretofore many devices have been provided for separating and classifying material of various kinds and some of these prior art devices have included one or more pairs of rollers, some of which have included helical grooves adapted to move the material generally longitudinally or transversely of the rollers to separate one material from another. However, these prior art devices have not been entirely satisfactory since they have been heavy, cumbersome, difficult to manufacture and maintain, have not provided sufficient separation of similar materials, have not met the exacting standards of food-processing machinery, and for other reasons have not been acceptable for the purpose intended.

The separation of meat from bone and gristle has always been a problem in the mechanical processing of the materials. As a rule the meat tends to cling to the bone of chicken or other fowl, particularly in pieces having relatively small vertebrae, such as the neck, and in which the specific gravities of the meat and the bone are substantially the same with the meat having a specific gravity of approximately 1.1 and the bone having a specific gravity of approximately 1.2. Many efforts have been made to separate meat from bone including by flotation in water or the like, such as in applicant's copending application Ser. No. 634,264 which operates satisfactorily to distinguish between meat and bone that have been separated from each other. However, a small portion of the material will still have the meat clinging to the bone and therefore water flotation cannot separate the materials. Normally the bone with meat clinging thereto has been discarded since no bone, gristle or other inedible material should be included in the packaged meat. Many people believe that the meat adjacent to the bone, particularly the meat of the neck, is the best meat of the fowl, and therefore in order to recover this meat that was previously lost, the present invention was devised.

SUMMARY OF THE INVENTION

The present invention is a bone and meat separator having a plurality of pairs of counterrotating rollers or cylindrical members with both rollers of each pair having a helical groove extending substantially the full length thereof. The rollers of each pair are parallel and spaced apart slightly so that relatively soft meat is gripped by the rollers and pulled through the opening between the rollers, while harder bone and gristle are moved toward one end of the rollers where they are discharged into a suitable receptacle. The meat which passes through the rollers falls by gravity onto a pan where it is washed to a drain screen where such meat is collected for further processing.

It is an object of the invention to provide an apparatus for separating meat from bone and such apparatus includes multiple pairs of generally parallel counterrotating rollers spaced apart a predetermined distance and having helical grooves so that relatively soft matter can be pulled downwardly between the rollers, while relatively hard bone and gristle will be moved lengthwise of the rollers and discharged into a suitable receptacle.

Another object of the invention is to provide a meat and bone separator having multiple pairs of generally parallel rollers each of which is provided with a helical groove and with the grooves on one roller being at a different pitch than the grooves on the other roller of each pair.

DESCRIPTION OF THE PREFERRED EMBODIMENTS

Figure 1:
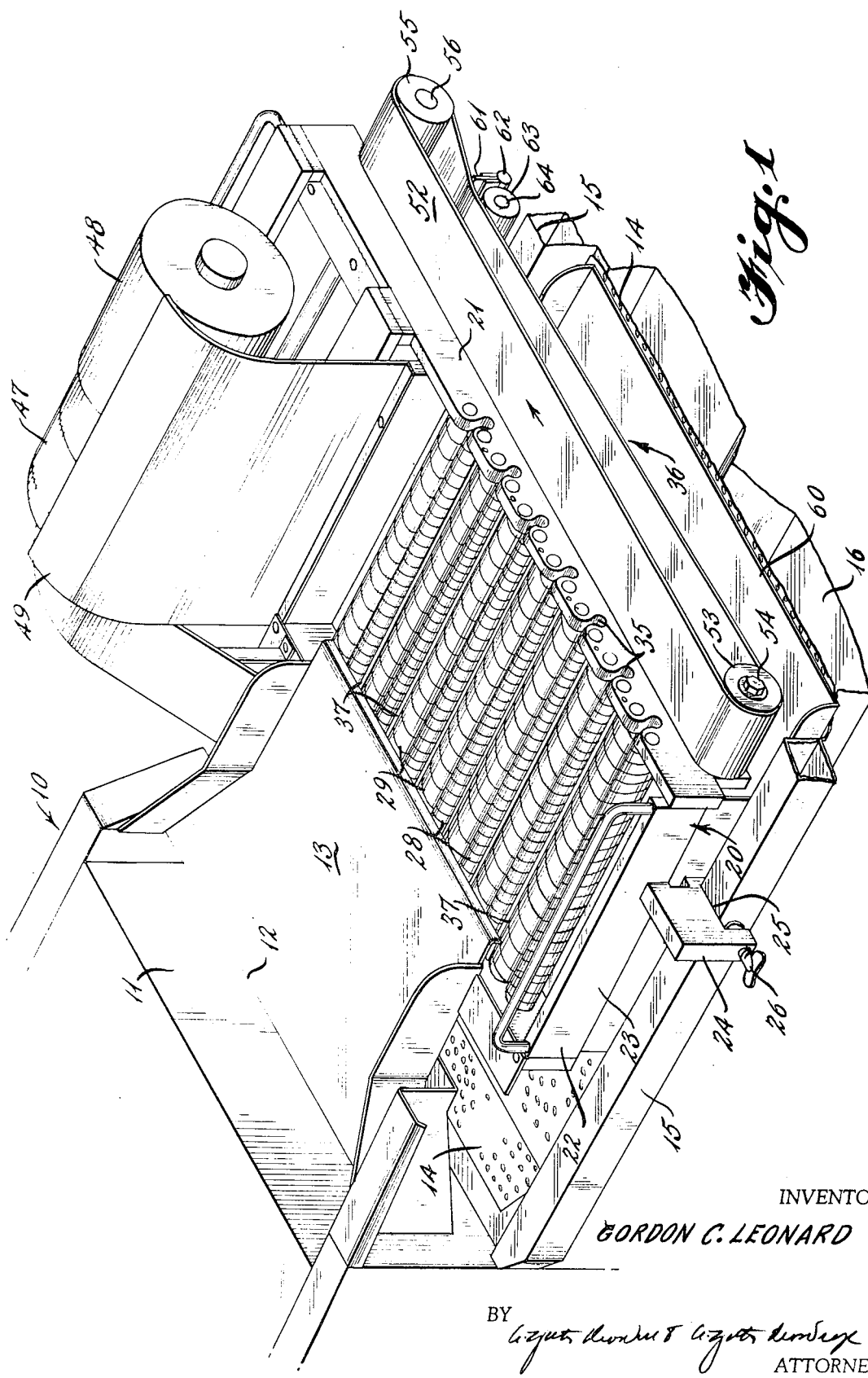
FIG. 1 is a perspective illustrating one application of the invention.

With continued reference to the drawings, normally a specific gravity deboning machine 10 is provided with a relatively narrow discharge channel 11 having an overflow lip 12 connected to a downwardly inclined chute 13. A mixture of meat and bone is introduced into the deboning machine 10 where a gently flowing upwardly rising column of water in the discharge channel 11 separates most of the meat from the bone by small differences in specific gravities and permits the slightly heavier bone to settle to the bottom of the deboning machine while the slightly lighter meat is washed over the overflow lip 12 and down the chute 13 onto a drain screen 14. Most of the bone and meat are separated in the deboning machine; however, some of the bone which still has meat clinging thereto is washed over the lip 12 with the meat. The structure thus far described is the subject matter of a prior application and forms no part of the present invention.

In order to separate meat from the bone to which it is clinging, the bone and meat separator of the present invention is located below the chute 13 and is mounted on rails 15 forming part of a pan 16 on which the drain screen 14 is mounted. The separator includes a generally hollow rectangular frame 20 having front and rear members 21 and 22 connected by end members 23. Each of the end members may have one or more mounting lugs 24 attached thereto and each of such lugs includes a recess 25 within which the rails 15 are received. Preferably each of the lugs 24 carries a wing screw 26 which can be adjusted lengthwise against the rails 15 to lock the frame 20 in fixed position relative to the chute 13.

Figure 2:
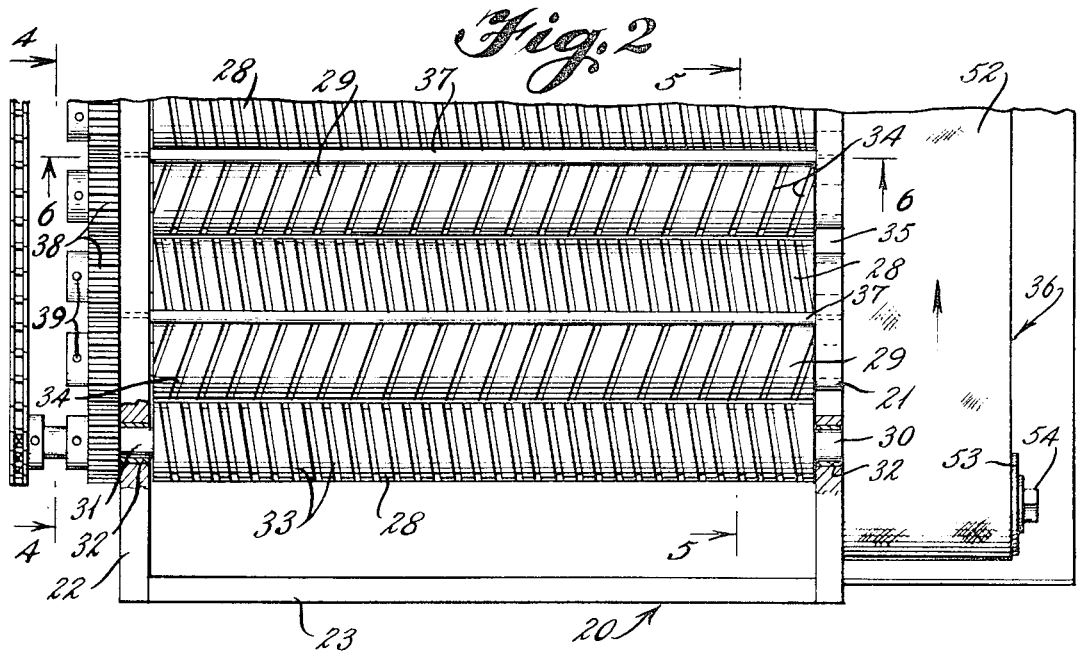
FIG. 2 is a fragmentary enlarged top plan view thereof.

A plurality of pairs of rollers 28 and 29 extend from front to rear of the frame 20 and each of such rollers is provided with a stub shaft 30 at one end and a stub shaft 31 at the opposite end. The stub shafts 30 and 31 are rotatably mounted in bearings 32 carried by the front and rear members 21 and 22. Each of the rollers 28 and 29 has a helical groove 33 and 34, respectively, which preferably are of different pitches, as illustrated in FIG. 2. As an example, the groove 33 on the roller 28 may have approximately three threads per inch, while the groove 34 on the roller 29 may have approximately two threads per inch. The rollers of each pair are parallel with each other and are spaced apart a distance of approximately one-eighth of an inch so that pieces of meat can be gripped by the rollers and pulled through the opening, while harder pieces of bone and gristle will not pass therethrough. Instead the bone and gristle are moved lengthwise of the rollers by the helical grooves so that they are discharged from the ends of the rollers.

Due to the different pitches of the helical grooves, the pieces of bone and gristle are tumbled so that any meat clinging thereto is gripped by the rollers and stripped from the bone. In order to discharge pieces of bone and gristle from the frame 20, the font member 21 has a plurality of notches or recesses 35 located substantially in alignment with the spacing between the rollers 28 and 29 so that a piece of bone or gristle travelling along the rollers is discharged through the notches 35 onto a discharge conveyor 36 which will be described later.

The rollers 28 and 29 of each pair are driven in counterrotating direction so that the generally cylindrical surfaces of each pair of rollers which are located adjacent to each other are moving downwardly and the surfaces of the pair of rollers remote from each other are moving upwardly. With this construction the surfaces of adjacent pairs of rollers are moving upwardly and in order to prevent meat and bone from entering the space between the rollers of adjacent pairs, an elongated rod 37 is disposed above and between pairs of rollers of adjacent pairs, an elongated rod 37 is disposed above and between pairs of rollers and located in close proximity thereto so that any meat or bone falling into the area between pairs of rollers will be carried over the top of one of the rollers and into the area between the rollers of each pair.

Figure 3:
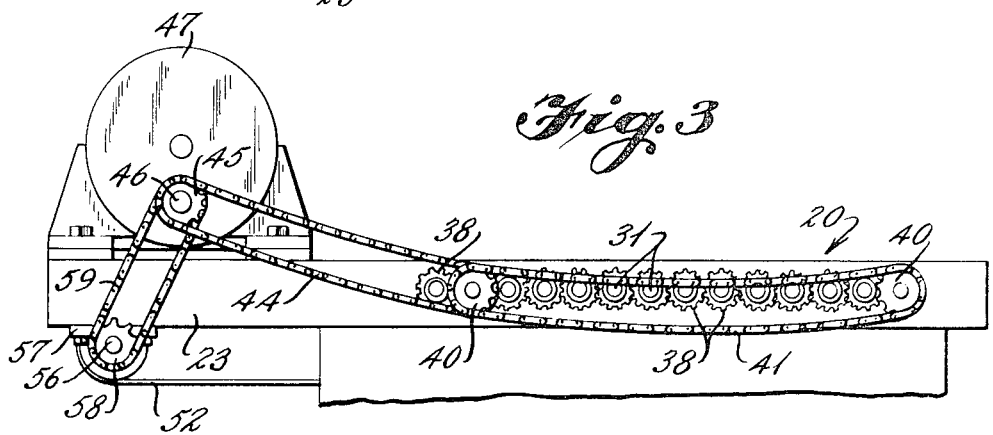
FIG. 3 is a fragmentary rear elevation.
Figure 4:
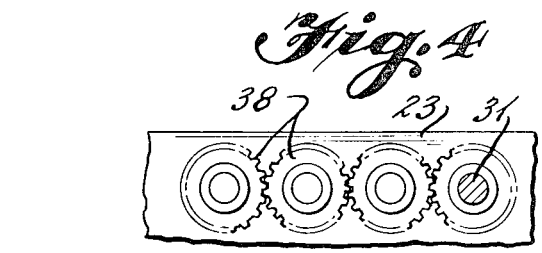
FIG. 4 is an enlarged section on the line 4—4 of FIG. 2.
Figure 5:
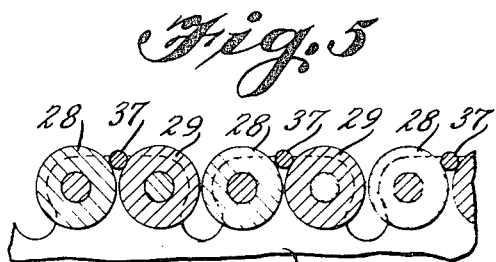
FIG. 5 is a section on the line 5—5 of FIG. 2.

In order to drive the pairs of rollers in counterrotating directions, the stub shafts 31 extend through the rear side member 22 and on each of such shafts a gear 38 is mounted and is fixed thereto in any desired manner, as by a setscrew 39. The gears 38 are of substantially the same size and intermesh with each other to provide a gear train such that when one of the shafts is driven, all of the shafts are driven. As illustrated in FIGS. 2 and 3, two of the stub shafts 31, preferably at opposite ends of the gear train, are longer than the remaining stub shafts. A sprocket 40 is mounted on each of the longer stub shafts and such sprockets are drivingly connected by a chain 41. A driven sprocket (not shown) is mounted on one of the longer stub shafts and such driven sprocket is connected by a chain 44 to a drive sprocket 45 mounted on a shaft 46 of a gear-reducing mechanism 47. The gear-reducing mechanism is driven by a power plant 48 mounted on one end of the frame 20. The power plant may be an electric motor, as illustrated, (or may be an internal-combustion engine, or a fluid motor) if desired. A splash shield 49 is disposed between the pairs of rollers 28 and 29 and the power plant 48 to prevent water or other liquid from splashing from the rollers onto the power plant which might have a harmful effect on the power plant.

The discharge conveyor 36 includes an endless belt 52 located along one side of the frame 20 and extending between an idler roller 53 freely rotatably mounted on a shaft 54 fixed to the frame 20 and a drive roller 55 fixed to a shaft 56 mounted in bearings 57 below the frame 20. In order to cause rotation of the drive roller 55, a driven sprocket 58 is mounted on the opposite end of the shaft 56 and such sprocket is connected by a chain 59 to a drive sprocket (not shown) mounted on the shaft 46 of the gear-reducing mechanism 47. In this manner the endless belt 52 is driven in timed relation with the rotation of the rollers 28 and 29.

Figure 7:
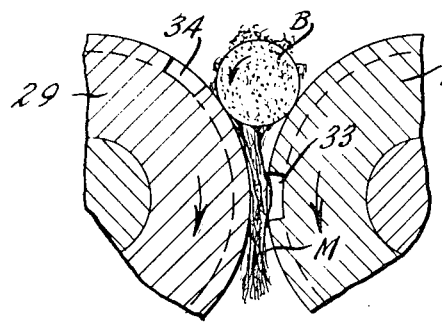
FIG. 7 is an enlarged fragmentary section illustrating two of the rollers and the manner in which they operate.
Figure 6:
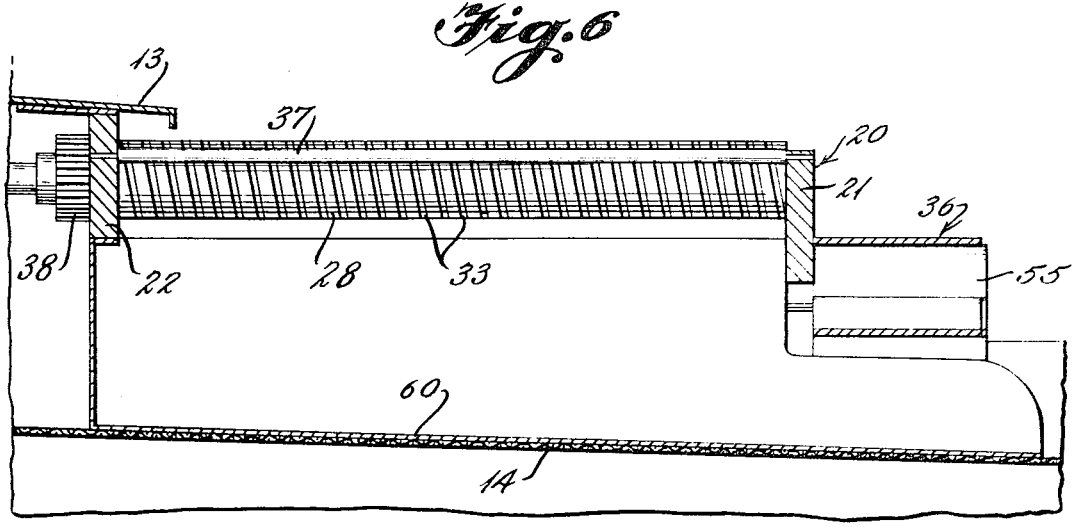
FIG. 6 is a section on the line 6—6 of FIG. 2.

With reference to FIG. 7, a piece of bone B having meat M clinging thereto is discharged onto the pairs of rollers so that when the rollers are rotated the meat M will be gripped by the rollers and will be pulled from the bone, while the bone is moved lengthwise of the rollers by the grooves 33 and 34 and discharged onto the discharge conveyor 36. Pieces of meat which pass between the rollers 28 and 29 fall by gravity onto a pan 60 where such pieces of meat are washed from the pan onto the drain screen 14 by water passing over the overflow lip 12 and down the chute 13. In order to make certain that pieces of bone do not cling to the belt 52 and drop onto the pan 60 or the drain screen 14, a scraper blade 61 is mounted on a support rod 62 carried by the frame 20, and such scraper blade engages the belt 52 to remove any pieces of bone clinging to such belt. If desired, an idler roller 63 freely rotatably mounted on a shaft 64 may be located adjacent to the scraper blade 61 to prevent excessive wear on the belt. Pieces of bone which fall onto the belt 52 are carried to one side of the separator and are discharged by gravity into a suitable receptacle (not shown).

In the operation of this modification, pieces of bone and meat as well as water from any desired source, such as deboning machine 10, flow down the chute 13 and are discharged onto the rollers 28 and 29. Pieces of meat which have already been separated from the bone pass through the space between adjacent rollers, while pieces of bone and gristle having meat attached thereto, as well as pieces of bone which have already been stripped of the meat but have been discharged over the overflow lip 12 and onto the rollers, cannot pass through the opening between the rollers. The pieces of bone are transferred lengthwise of the rollers by the grooves 33 and 34, while any pieces of meat still clinging to the bone are gripped by the rollers and pulled therefrom. The pieces of meat which pass through the rollers fall by gravity onto the pan 60 together with the water from the chute 13 and such water washes the meat from the pan 60 onto the drain screen 14. Pieces of bone which are moved lengthwise of the rollers are discharged onto the conveyor 36 where such pieces of bone are transferred laterally of the machine and are discharged into a suitable receptacle.

Figure 8:
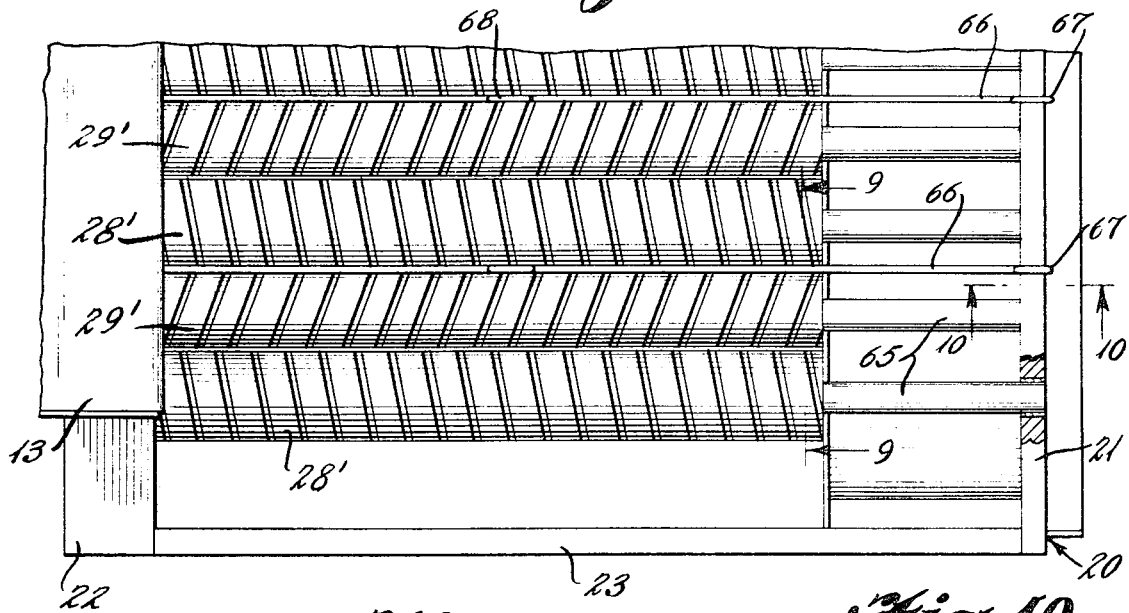
FIG. 8 is a top plan view of a modified form of the invention.
Figure 9:
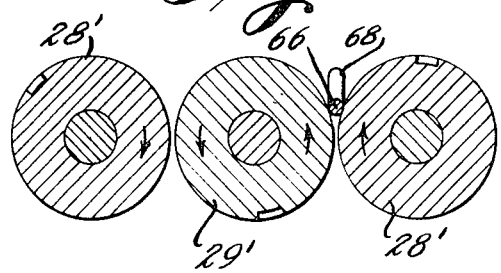
FIG. 9 is an enlarged section illustrating the arrangement of the rollers of FIG. 8.
Figure 10:
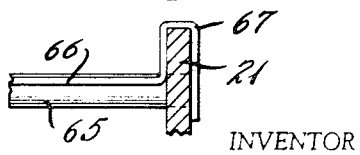
FIG. 10 is a section on the line 10—10 of FIG. 8.

With reference to FIGS. 8-10, a modified form of the invention is disclosed in which the rollers 28' and 29' are mounted on the frame 20 and each of such rollers has a reduced end portion 65 located between the front and rear members 21 and 22. In this modification the discharge conveyor 36 is located below the reduced end portions 65 of the rollers so that pieces of bone being moved lengthwise of the rollers can fall by gravity between the reduced end portions onto the discharge conveyor 36. As illustrated in FIGS. 8-10, the rods 37 are replaced by rods 66 of smaller diameter in cross section and if desired the rods 66 may have an end portion 67 bent to form a clip which frictionally engages the front and rear members 21 and 22 of the frame. Since the rods 66 are of less diameter than the rods 37, such rods 66 preferably are provided with one or more upstanding U-shaped portions 68 which prevent pieces of bone and meat from passing down the groove between adjacent pairs of rollers and which cause the bone and meat to ride over the top of the rollers into the area between the rollers of each pair where the meat is gripped by the rollers and drawn between the same while the bone is discharged between the reduced end portions 65 onto the discharge conveyor 36.

I claim:

1. Apparatus for separating meat from bone comprising a frame, a plurality of pairs of rollers rotatably mounted on said frame, each of said rollers having a generally cylindrical portion with a helical groove extending substantially the entire length thereof, the rollers of each pair having their cylindrical portions located adjacent to but spaced slightly from each other to permit relatively soft meat to pass therebetween and to prevent the passage of relatively hard bone, means for driving the rollers of each pair in counterrotating directions with the surfaces adjacent to each other rotating in a downward direction, and means for discharging the bone from the apparatus.

2. The structure of claim 1 in which the helical groove of one roller has a different pitch from the helical groove of the other roller.

3. The structure of claim 1 in which said means for discharging bone includes a discharge conveyor having an endless belt.

4. The structure of claim 3 including scraper means for removing bones that cling to said belt.

5. The structure of claim 1 in which said pairs of rollers are located adjacent to but spaced slightly from each other.

6. The structure of claim 1 including means carried by said frame for directing meat and bone to the downwardly rotating surfaces of said pairs of rollers.

7. The structure of claim 1 in which each of said rollers includes a portion of reduced diameter between which the bone is discharged.

8. The structure of claim 1 including pan means for receiving meat passing between said rollers.

9. Apparatus for separating relatively soft material from relatively hard material comprising a frame, a plurality of pairs of rollers having generally cylindrical portions rotatably mounted on said frame, each of said rollers having a helical groove extending substantially the entire length of said cylindrical portions, the rollers of each pair having their cylindrical portions located adjacent to but spaced slightly from each other to permit relatively soft material to pass therebetween and to prevent the passage of relatively hard material, means for driving the rollers of each pair in counterrotating directions, and discharge conveyor means mounted on said frame in a position to receive relatively hard material from said generally cylindrical portions and to discharge the same from said apparatus.